(12) United States Patent
Kimura

(10) Patent No.: US 11,983,003 B2
(45) Date of Patent: May 14, 2024

(54) PRODUCTION EFFICIENCY IMPROVEMENT SUPPORT SYSTEM

(71) Applicant: iSmart Technologies Corporation, Aichi (JP)

(72) Inventor: Tetsuya Kimura, Aichi (JP)

(73) Assignee: iSmart Technologies Corporation, Aichi (JP)

( * ) Notice: Subject to any disclaimer, the term of this patent is extended or adjusted under 35 U.S.C. 154(b) by 90 days.

(21) Appl. No.: 17/493,336

(22) Filed: Oct. 4, 2021

(65) Prior Publication Data

US 2022/0026897 A1  Jan. 27, 2022

Related U.S. Application Data

(63) Continuation of application No. PCT/JP2020/014017, filed on Mar. 27, 2020.

(30) Foreign Application Priority Data

Apr. 5, 2019 (JP) .................................. 2019-072909

(51) Int. Cl.
*G05B 23/02* (2006.01)
*G05B 19/418* (2006.01)

(52) U.S. Cl.
CPC ... *G05B 23/0294* (2013.01); *G05B 19/41865* (2013.01); *G05B 2219/23123* (2013.01);
(Continued)

(58) Field of Classification Search
CPC .... G06Q 10/06; G06Q 10/0639; G06Q 50/04; G06Q 10/06375; G06Q 10/063;
(Continued)

(56) References Cited

U.S. PATENT DOCUMENTS 5,195,041 A * 3/1993 George ................. G06Q 10/06
700/111
5,228,119 A * 7/1993 Mihalisin .............. G06T 11/206
345/441
(Continued)

FOREIGN PATENT DOCUMENTS

JP 2007-141208 6/2007
JP 2018-32396 3/2018
(Continued)

OTHER PUBLICATIONS

International Search Report from International Application No. PCT/JP2020/014017 dated Jun. 16, 2020.

*Primary Examiner* — Darrin D Dunn
(74) *Attorney, Agent, or Firm* — Beyer Law Group LLP

(57) ABSTRACT

A production efficiency improvement support system calculates an operational availability and a cycle time, based on results of detection of an operating status of production equipment, and displays a chart. An axis of the cycle time is set to be shorter rightward. The results of detection are displayed in such a mode that variations are recognizable, like points pp1 and points pp2. The points pp1 and the points pp2 have different countermeasures applied for improvement of the production efficiency and are accordingly displayed in different display modes. A point p1 and a point p2 indicating values of an actual cycle time and an actual operational availability are also displayed as representative values of the results of detection. Displaying these indexes in the form of a chart facilitates visual recognition of how to improve the operational availability and the cycle time and effectively supports improvement of the production efficiency.

11 Claims, 8 Drawing Sheets

(52) U.S. Cl.
CPC .............. *G05B 2219/23254* (2013.01); *G05B 2219/23437* (2013.01)

(58) Field of Classification Search
CPC ....... G06Q 10/06315; G06Q 10/06395; G05B 13/048; G05B 23/0283; G05B 19/418; G05B 19/41865; G05B 19/41885; G05B 2219/32404; G05B 19/4183; G05B 19/4184; G05B 19/41875; G05B 2219/23123; G05B 2219/24033; G05B 2219/32187; G05B 2219/31411; G05B 2219/32194; G05B 23/024; G05B 23/0294; G05B 23/0235; G05B 23/0208

See application file for complete search history.

(56) References Cited

U.S. PATENT DOCUMENTS

| | | | | |
|---|---|---|---|---|
| 6,678,636 | B1 * | 1/2004 | Coleman | G06F 11/0736 702/182 |
| 7,672,745 | B1 * | 3/2010 | Tuszynski | G05B 19/41875 700/29 |
| 8,195,426 | B1 * | 6/2012 | Antanies | G05B 23/0267 702/182 |
| 10,054,936 | B2 * | 8/2018 | Gobalakrishnan | G06Q 50/04 |
| 10,402,246 | B2 * | 9/2019 | Wang | G06F 11/3082 |
| 10,444,949 | B2 * | 10/2019 | Scott | G06F 3/0484 |
| 2004/0034555 | A1 * | 2/2004 | Dismukes | G06Q 10/06 700/120 |
| 2007/0090178 | A1 | 4/2007 | Fujii et al. | |
| 2007/0198135 | A1 * | 8/2007 | Chang | G05B 19/4184 700/300 |
| 2009/0143889 | A1 * | 6/2009 | Brady | G05B 19/4184 700/108 |
| 2010/0162029 | A1 * | 6/2010 | Powell | G06Q 50/04 714/E11.029 |
| 2010/0318934 | A1 * | 12/2010 | Blevins | G05B 19/41875 700/110 |
| 2012/0083917 | A1 * | 4/2012 | Zhou | G05B 19/41875 700/110 |
| 2012/0323616 | A1 * | 12/2012 | Schricker | G06Q 10/063 705/7.11 |
| 2013/0124460 | A1 * | 5/2013 | Grove | G06F 16/21 707/609 |
| 2015/0039552 | A1 * | 2/2015 | Moyne | G05B 23/0243 706/46 |
| 2016/0247395 | A1 | 8/2016 | Sugihara et al. | |
| 2017/0104640 | A1 * | 4/2017 | Jain | H04L 41/5019 |
| 2018/0052452 | A1 | 2/2018 | Kimura | |

FOREIGN PATENT DOCUMENTS

| | | |
|---|---|---|
| JP | 2018-185653 | 11/2018 |
| WO | 2015/029229 | 3/2015 |

* cited by examiner

PRODUCTION EFFICIENCY IMPROVEMENT SUPPORT SYSTEM

CLAIM OF PRIORITY

This application is a Continuation of International Patent Application No. PCT/JP2020/014017, filed on Mar. 27, 2020, which, which claims benefit of Japanese Patent Application No. 2019-072909 filed on Apr. 5, 2019. The entire contents of each application noted above are hereby incorporated by reference.

BACKGROUND OF THE INVENTION

1. Field of the Invention

The present disclosure relates to a production efficiency improvement support system configured to support improvement of production efficiency in production equipment used to produce a product.

2. Description of the Related Art

With regard to production equipment used to produce a product, it is required to improve the efficiency of production of the product, i.e., the production efficiency, and it is also required to recognize the current production efficiency as its premise. For the purpose of objectively recognizing the operating status of the production equipment, the recent attempts have mounted a variety of sensors to the production equipment to detect their operating conditions.

For example, Japanese Laid-Open Publication No. 2018-32396A discloses a production management system configured to detect an operating status of production equipment by detectors, such as an optical sensor and an acoustic sensor, externally attached to the production equipment and to manage results of detection by a management device. In this disclosure, a list of cycle time in times series is displayed as its output example.

Japanese Laid-Open Publication No. 2018-185653A discloses a technique of obtaining statistical values of cycle time based on detection signals detected from production equipment and determining an actual cycle time by using the statistical values. In this disclosure, a chart with operational availability (may also referred to as operation rate or utilization rate) as ordinate and cycle time as abscissa is displayed as its output example.

BRIEF DESCRIPTION OF THE INVENTION

It has conventionally been known that the operational availability and the cycle time are useful indexes indicating the operating status of production equipment. It has, however, been found that simple recognition of the operational availability and the cycle time from a macro viewpoint, for example, in the unit of one day, is insufficient to improve the production efficiency. For improvement of the production efficiency, it is necessary to analyze the causes of a decrease in production efficiency. For this purpose, it has been desired to recognize the varying situation of the operational availability and the cycle time.

By taking into account the problems described above, an object of the present disclosure is to output useful indexes with a view to improving production efficiency in production equipment and thereby support the improvement.

According to one aspect of the present disclosure, there is provided a production efficiency improvement support system configured to support improvement of production efficiency in production equipment used to produce a product. The production efficiency improvement support system comprises a production management index calculator configured to calculate an operational availability that is a time rate when the production equipment operates, and a cycle time that is a time period required for production of the product, multiple number of times during operation of the production equipment, based on results of detection obtained by detecting an operating status of the production equipment; and a display controller configured to display a chart with the operational availability as ordinate and the cycle time as abscissa, in such a state that variations of the calculated operational availability and of the calculated cycle time are visually recognizable.

In the description hereof, the production efficiency means the number of products produced per hour, i.e., the production output per hour.

The cycle time means a time period required for producing one product. The cycle time may be obtained, for example, by measuring a time interval when a product is output from production equipment (the cycle time thus obtained is hereinafter referred to as "measured cycle time"). The cycle time may alternatively be calculated by (operable time−downtime)/production number in the same time period (sec) of the production equipment. The operable time herein means a time period when the production equipment is supposed to operate and is, for example, a time period calculated by subtracting production downtimes such as a lunch break from the operating hours.

The operational availability means a ratio of time during which the production equipment is operating and may be calculated by any of various methods. For example, the operational availability may be calculated by a method of integrating the measured cycle times determined as normal to determine an operating time that is a time period when the production equipment actually operates and dividing the operating time by the required time that is a time period required for operation of the production equipment, i.e., operating time/required time×100(%). The measured cycle time determined as normal may be limited to measured cycle times of not greater than a predetermined reference value that is set to be, for example, double a mean value, among the actually measured cycle times. The measured cycle time determined as normal may alternatively be obtained by a method of detecting signal outputs indicating normality or abnormality from the production equipment and measuring a cycle time during a time period when a normality signal is output or during a time period when no abnormality signal is output. The operational availability may also be calculated by using an operating time that is determined from a mean value of the measured cycle time×production volume. In this case, the mean value of the measured cycle time may be determined by limitation to measured cycle times of not greater than a predetermined reference value.

The operational availability may also be calculated by (operable time−downtime)/operable time×100(%). In this case, (operable time−downtime) may be calculated by a method of detecting signal outputs indicating normality or abnormality from the production equipment and integrating an output time of normality or may be calculated by a method of integrating an output time of abnormality and subtracting the integrated output time from the operable time.

The operational availability may be determined by (required time per one product×required number)/actual required time×100(%). The actual required time herein means a time period actually required to produce a required number of products.

The configuration of this aspect calculates the operational availability and the cycle time multiple number of times during operation of the production equipment.

One available procedure may divide a time period from a start to a stop of operation of the production equipment into a plurality of time zones and calculate the operational availability with regard to each of the time zones. The time zones used for the calculation may be set arbitrarily. The time zones are not necessarily continuous and do not necessarily have an identical duration. For recognition of the operating status with high accuracy, however, a shortest possible duration is preferable. It is also preferable to set the duration used for calculation of the operational availability, based on a mean continuous operating time, a mean downtime, and a mean interval of stops of the production equipment. Setting the duration to include both the operation state and the stop state enables the operational availability to be determined with high accuracy.

In the case of using the measured cycle time as the cycle time, the cycle time is obtained every time the product is produced. In the case of calculating the cycle time by (operable time−downtime)/production number in the same time period (sec), the cycle time may be calculated with regard to each of a plurality of time zones, like the operational availability. The division of the time zones for calculating the operational availability may not be necessarily identical with the division of the time zones for calculating the cycle time.

In the case of calculation with regard to the respective time zones, the time zones may be overlapped with each other. For example, the operational availability and the cycle time at a time of 10:00 may be calculated by using the results of detection in an immediately preceding time zone of 10 minutes, and the operational availability and the cycle time at a time of 10:01 may be calculated by using the results of detection in an immediately preceding time zone of 10 minutes. In this case, the time zones for calculating the operational availability and the cycle time at the respective times have some overlaps. Such setting has no problem.

In this aspect of the present disclosure, the operational availability and the cycle time thus obtained are displayed in a chart with the operational availability and the cycle time with two axes. Points indicating the values of the operational availability and the cycle time obtained in a specified time or in a specified time zone are plotted in the chart.

The configuration of this aspect displays the operational availability and the cycle time with their variations in a visually recognizable manner. For example, when a sufficient number of the operational availability and the cycle time are obtained, these results of detection may be plotted simply. This is because the degree of variation of the results of detection is relatively readily recognizable by the density of points. Another method may draw a curve including the obtained results of detection or may display the chart by color coding according to the density of the results of detection.

The configuration of displaying the operational availability and the cycle time with their variations enables the operating status of the production equipment to be recognized with the higher accuracy and facilitates examination of countermeasures for improving the production efficiency. For example, in a chart with the cycle time as abscissa and the operational availability as ordinate, when the results of detection are expressed by a distribution in the direction of ordinate, i.e., when the cycle time has a relatively small fluctuation range but the operational availability has a relatively large fluctuation range, it may be determinable that narrowing the fluctuation range of the operational availability or improving the operational availability is effective for improvement of the production efficiency. When the results of detection are expressed by a distribution in the direction of abscissa, i.e., when the cycle time has a relatively large fluctuation range but the operational availability has a relatively small fluctuation range, on the contrary, it may be determinable that stabilizing or shortening the cycle time is effective for improvement of the production efficiency.

As described above, this aspect of the present disclosure displays the operating state on the chart of the operational availability and the cycle time with their variations in a recognizable manner and thereby provides information useful for improvement of the production efficiency.

In the production efficiency improvement support system of the above aspect, the production management index calculator may calculate an actual cycle time as a representative value of a plurality of the cycle times by statistical processing, and the display controller may additionally display the actual cycle time in the chart.

The configuration of this aspect enables the degree of variation relative to the representative value of the cycle time as the criterion to be visually recognized. As described above, it is important to recognize the variations of the operational availability and the cycle time, with a view to improving the production efficiency. The configuration of displaying the representative value indicating the entirety of the results of detection like this aspect enables the variation to be recognized more objectively.

The representative value adopted may be a mode value or an average value of the detected cycle time. It is more preferable to calculate the average value after exclusion of cycle times determined as abnormal values from the detected cycle times. A method employable to exclude the abnormal values may exclude a predetermined number of cycle times in a descending order from the maximum value and also exclude a predetermined number of cycle times in an ascending order from the minimum value.

Similarly, an actual operational availability obtained by statistical processing may also be displayed with regard to the operational availability.

In the production efficiency improvement support system of the above aspect, the production management index calculator may calculate the operational availability and the cycle time with regard to each of states of item application for improving the production efficiency, and the display controller may display the operational availability and the cycle time with changing a display mode according to the state of item application, such as to allow for comparison between different states of item application.

Various countermeasures are taken in the production equipment for the purpose of improvement of the production efficiency (hereinafter these countermeasures are referred to as "items"). The display of the operational availability and the cycle time is to be made with regard to an identical state of item application. In order to learn the effects of application of an item, it is required to recognize how to change the operational availability, the cycle time, and their variations by application or non-application of the item.

The configuration of this aspect changes the display mode according to the state of item application and thereby enables the effects of application of an item to be visually and easily recognized. Any of various methods may be employed to change the display mode, for example, changing the display colors or changing the shape of symbols or changing the type and the thickness of lines used for the display.

In the configuration of changing the display mode according to the item, the display controller may display the operational availability and the cycle time in relation to each state of item application in such a manner as to be recognizable in the chart.

The configuration of this aspect enables the applied item to be readily recognized in the chart displaying the operational availability and the cycle time.

A method of display adoptable in this aspect may, for example, display the state of item application in the vicinity of a symbol or the like indicating the results of detection displayed in the chart. The state of item application may be displayed in the form of a pop-up by touching such a symbol with a pointing device.

In the production efficiency improvement support system of the above aspect, the display controller may allow a target of the production efficiency to be input in the chart by an operation of a pointing device.

The configuration of this aspect enables an operator to input a target of the production efficiency, while visually checking the chart. More specifically, this configuration allows probable goals of the operational availability and the cycle time to be set by recognizing the current conditions of the operational availability and the cycle time and taking into account rooms for improvement. Any of various methods may be adopted to concretely set the goals. For example, one available method may specify one point on the chart with a pointing device. Another available method may specify target values of the operational availability and the cycle time on the respective axes with a pointing device. When a target value of one of the operational availability and the cycle time is specified with a pointing device, a target value of the other may be automatically set by computation. For example, there is a relational expression of "target production volume=operation time×operational availability/cycle time" between the target production volume, the operation time (a time period from a start to a stop) of the production equipment, the operational availability and the cycle time. When one of the operational availability and the cycle time is specified, the other may be set according to this relational expression.

The production efficiency improvement support system of the above aspect may further comprise an input unit configured to input a target of the production efficiency; and an item database configured to store a record of effects of application of each item on the operational availability and the cycle time. The production efficiency improvement support system may be configured to refer to the item database and recommend an item to be applied to make the operational availability and the cycle time of the production equipment approach the target.

There are a large number of items for improving the production efficiency. In many cases, it is difficult to select an appropriate item. In the production efficiency improvement support system of this aspect, the record of the effects of application of each item is stored in the item database. This configuration advantageously enables an item for making the operational availability and the cycle time approach the target to be readily selected by referring to the item database.

In this aspect, any of various methods may be employed to recommend the item. For example, one employable method may compare target values of the operational availability and the cycle time with the actual values, set improvement goals of the operational availability and the cycle time to achieve the target values, refer to the item database, and select an item expected to have the effects corresponding to the set improvement goals. Another available method may use an artificial intelligence. This method uses past records of the effects of application of each item as learning data of machine learning and selects an item that achieves the target of the operational availability and the cycle time, according to the actual operating status and the state of item application. In this method, the item database may be configured to store the learning data for machine learning or to store a learning model that has been learnt in advance.

According to another aspect of the present disclosure, there is provided a production efficiency improvement support system configured to support improvement of production efficiency in production equipment used to produce a product. The production efficiency improvement support system comprises a production management index calculator configured to refer to results of detection obtained by detecting an operating status of the production equipment including downtimes of the production equipment and calculate an accumulated downtime with regard to each of a plurality of downtime duration groups (downtime ranges), which are set in advance according to duration of the downtime; and a display controller configured to display a chart showing the accumulated downtime with regard to each of the downtime duration groups.

In order to improve the production efficiency, it is preferable to eliminate the cause of stopping the production equipment. For this purpose, a generally preferential procedure specifies the cause of an event of long downtime and eliminates the cause. Detection of the real operating status, however, suggests the possibility of an accumulated long downtime caused by frequent short-time stops.

The configuration of the above aspect displays the accumulated downtime with regard to each downtime duration group in the chart and thereby enables the downtime duration group having the high accumulated downtime to be readily recognized. Eliminating the causes of the stops in this downtime duration group effectively reduces the downtime of the production equipment and improves the production efficiency.

The downtime duration group of the above aspect may be set arbitrarily, for example, 0 to A minutes and A to B minutes. The durations of the respective downtime duration groups are not necessarily identical with each other. It is not necessary that the downtime duration group is unequivocally mapped to the cause of the stop. Setting the downtime duration group to be mapped to the cause of the stop is, however, advantageous to relatively readily find a countermeasure.

It is not necessary that the respective aspects of the present disclosure are provided with all the various features described above, but part of such features may appropriately be omitted or be provided in combination with other features.

The present disclosure is not limited to the configuration of the production efficiency improvement support system but may be configured as a production efficiency improvement support method that causes a computer to perform each of the displays described above and thereby support improvement of the production efficiency. The present disclosure may also be configured as a computer program that causes a computer to support improvement of production efficiency. The present disclosure may further be configured as a computer readable recording medium in which such a computer program is recorded.

DETAILED DESCRIPTION OF EMBODIMENTS OF THE INVENTION

A. System Configuration

Figure 1:
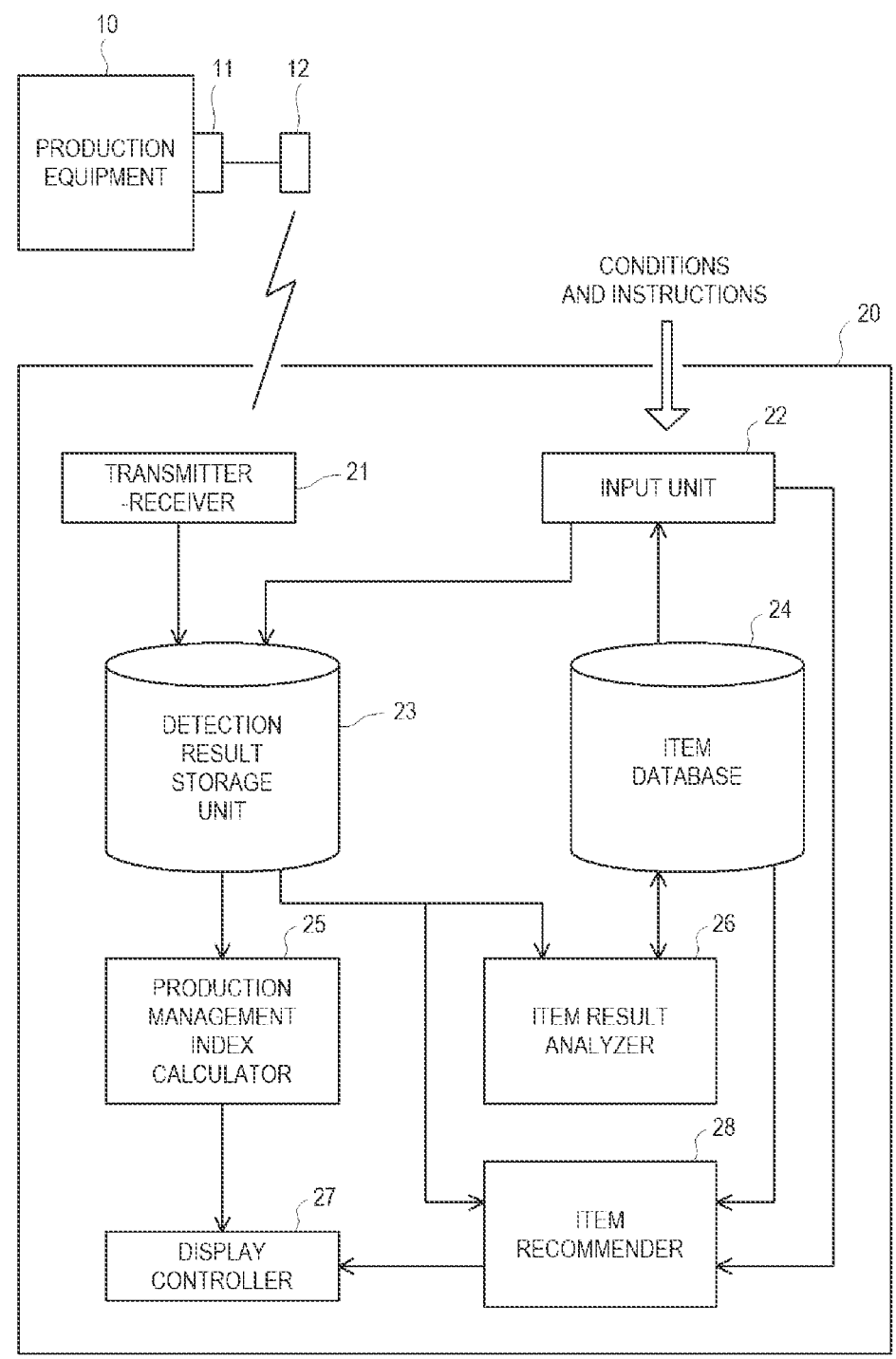
FIG. 1 is an explanatory diagram illustrating the configuration of a production efficiency improvement support system.

FIG. 1 is an explanatory diagram illustrating the configuration of a production efficiency improvement support system. This system recognizes the operating status of production equipment in a factory and visually display the recognized operating status, so as to support countermeasures taken to improve the production efficiency.

Production equipment 10 may be any apparatus configured to produce a product. The production equipment 10 is illustrated as a single apparatus in FIG. 1 but may be a production line or may be a plurality of apparatuses or a plurality of production lines.

Sensors 11 are configured to detect the operating status of the production equipment 10. It is preferable that the sensors 11 are externally attached to the production equipment 10, although this configuration is not essential. The sensors 11 provided include, for example, a sensor of detecting a pulse output every time a product is completed and a sensor of detecting whether the production equipment 10 is in operation or at stop. For example, a configuration that includes a light source located at a position where a completed product passes through and a light receiving element provided to receive the light from this light source and that detects the light blocked every time the product passes through may be used as one of the sensors 11. An optical sensor, an acoustic sensor, a thermal sensor, a current sensor, a distance sensor, an atmospheric pressure sensor, an acceleration sensor, a rotation speed sensor, a humidity sensor, a pressure sensor and the like configured to detect the light, the sound, the vibration and other pieces of information generated in the production equipment 10 in operation or at stop may also be used for the sensors 11. Sensors of detecting signals intrinsically outputting in the production equipment 10 may also be used for the sensors 11.

A transmission device 12 is configured to send various signals detected by the sensors 11 to a production efficiency improvement support system 20. The transmission may be wired transmission or wireless transmission. The timing of transmission may be any of various settings. For example, the timing of transmission may be at the time when signals are detected by the respective sensors 11 or or may be at the time when a predetermined amount of signals is accumulated.

The production efficiency improvement support system 20 is a system configured to receive the signals from the sensors 11 and output information useful for improving the production efficiency. According to the embodiment, the production efficiency improvement support system 20 is configured as a software configuration by installing computer programs for implementing a variety of illustrated functional blocks into a computer provided with a CPU and memories. Part or the entirety of the functional blocks may, however, be configured as a hardware configuration. The production efficiency improvement support system 20 is not limited to a standalone configuration but may be configured as a distribution system including a plurality of servers and the like connected with each other via a network.

The respective functional blocks are described below.

A transmitter-receiver 21 is configured to send and receive signals to and from the transmission device 12.

A detection result storage unit 11 is configured to store the results of detection by the sensors 11. The contents and the structure of information stored will be described later.

An input unit 22 is configured to input a variety of conditions and instructions, based on, for example, the operator's operations of a keyboard, a mouse, a touch panel and the like. The conditions include, for example, the specification of the production equipment 10 to be subjected to the detection, and the contents that are likely to affect the results of the detection, for example, a countermeasure for improving the production efficiency, i.e., an item, applied to the production equipment 10. The conditions may also include description of, for example, the date and time, the location, and the name of the product. The instructions include target values of the production efficiency, the production output and the like. The input unit 22 may be configured to input the conditions and the instructions from another server or the like via the network, in addition to the operator's operations.

A production management index calculator 25 is configured to calculate production management indexes, based on the results of detection stored in the detection result storage unit 23. According to the embodiment, the production management index calculator 25 calculates an operational availability, a cycle time, an actual operational availability, an actual cycle time and a downtime. These production management indexes may be calculated in real time or may be calculated based on the results of past detection.

The actual operational availability and the actual cycle time are representative values obtained respectively by statistical processing of the operational availability and the cycle time. The representative value may be, for example, a mode value out of the results of calculation of the operational availability or the cycle time as the processing object or may be a mean value. The mean value may be calculated by excluding values determined as abnormal from the results of calculation.

An item database 24 is a database configured to store information with regard to countermeasures for improving the production efficiency, i.e., items. The item database 24 stores the contents, a past record of application, and the like with regard to each item. The contents and their structure to be stored will be described later.

An item effect analyzer 26 is configured to refer to the past records and the conditions linked with the respective results of detection stored in the detection result storage unit 23 and to analyze the effect of application of an item on improvement of the operational availability, the cycle time and the like. For example, for the purpose of analyzing the effect of application of a certain item, past records having identical conditions other than application or non-application of the item are selected and are compared with each other. The effect of application of an item differs, depending on the conditions, for example, application of other items, and is thus analyzed in relation to application of the other items. The item effect analyzer 26 stores the results of the analysis into the item database 24.

An item recommender 28 is configured to recommend an item according to target values of the operational availability and the cycle time, in order to achieve these target values. As described above, the effect of application of each item is analyzed by the item effect analyzer 26 and is stored in the item database 24. The item recommender 28 refers to the item database 24 and selects an item that has the effect according to the target values.

The item effect analyzer 26 and the item recommender 28 may be configured by using an artificial intelligence. For example, the item effect analyzer 26 may use the artificial intelligence and learn the effect of application of an item by machine learning. This configuration uses the past records stored in the detection result storage unit 23 as learning data and performs regression analysis with each item in the item database 24 as an explanatory variable and the results of the operational availability and the cycle time stored in the detection result storage unit 23 as objective variables. The item recommender 28 accordingly specifies an item according to a target operational availability and a target cycle time by taking advantage of a learning model thus obtained.

A display controller 27 is configured to generate display data to display a variety of screens for supporting improvement of the production efficiency and display the generated display data on a display. The display is not necessarily a display directly connected with the production efficiency improvement support system 20 but may be a screen of a computer connected with the production efficiency improvement support system 20 via a network. According to the embodiment, a chart indicating a relationship between the operational availability and the cycle time is displayed as a display screen. The display controller 27 also serves to display an item recommended for improvement of the production efficiency.

Figure 2:
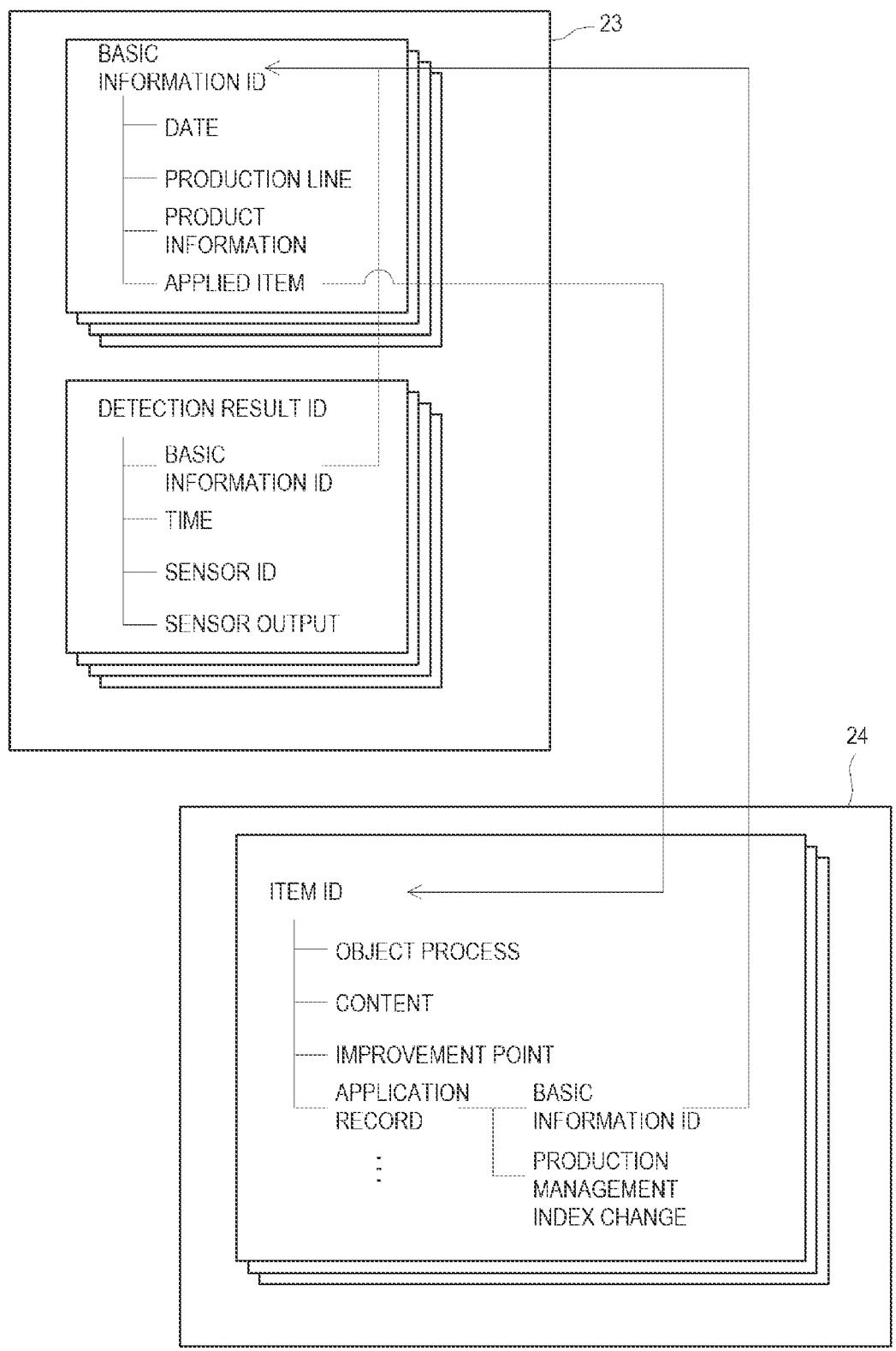
FIG. 2 is an explanatory diagram illustrating the structure of databases.

FIG. 2 is an explanatory diagram illustrating the structure of databases. The contents and the structure of data stored in the detection result storage unit 23 and stored in the item database 24 are illustrated. FIG. 2 illustrates only one example of these databases, and the contents and the structure are not limited to those described herein.

An upper left of the drawing illustrates the data structure of the detection result storage unit 23. The storage of the detection result storage unit is roughly classified into basic information and results of detection, which are linked with each other. "Basic Information ID" denotes unique identification information allocated to each record of the basic information. "Date" denotes information of the year, the month and the date of production. "Production Line" denotes information for identifying a production line that is an object of detection of the operating condition and may be, for example, the name of the production line or a code allocated to the production line. "Product Information" denotes information for identifying a product produced in the production line and may be, for example, the name or a product number. "Applied Item" denotes information for identifying the type of an item applied to the production line for improvement of the production efficiency. According to the embodiment, the contents and the like of each item are stored with identification information, i.e., an item ID, in the item database 24. The item ID is accordingly stored as the "applied item". These pieces of information provide the basic facts showing under which conditions the results of detection are obtained. In the case of application of a plurality of items, a plurality of item IDs are stored as "Applied Item". The basic information may further include many other pieces of information, in addition to the information illustrated above.

The information obtained from the production equipment 10 is continuously stored as the results of detection. "Detection Result ID" denotes unique identification information allocated to each record of the results of detection. "Basic Information ID" denotes information that links the results of detection with basic information. The basic information, for example, the date and the production line, linked with each result of detection is obtained by referring to the basic information based on the basic information ID. "Time" denotes a time when each result of detection is obtained. "Sensor ID" denotes identification information for identifying the sensor 11 used for the detection. "Sensor Output" denotes a result detected by the sensor 11.

According to the embodiment, in the case where multiple pieces of information are obtained from a plurality of sensors 11 at the same time, individual records having individual detection result IDs allocated to these multiple pieces of information and including different sensor IDs and sensor outputs are created. For example, in the case of obtaining a measured cycle time based on the results of detection, records of a sensor ID allocated to a sensor configured to detect completion of each product are extracted from the results of detection, and a time interval of the respective sensor outputs is determined. Similarly, in the case of calculating another production management index, the corresponding outputs are extracted from the results of detection and are used for calculation.

The results of detection are not limited to the contents or the structure illustrated in FIG. 2. For example, records may be created on the basis of time.

In another example, at the time when information is obtained, the obtained information may be classified into information for calculating the operational availability and information for calculating the cycle time. The classified groups of information may be stored individually in time series. This configuration has such advantages as the simplified process of calculating the production management indexes, for example, the operational availability and the cycle time, and the resulting reduction of the processing load.

A lower right of the drawing illustrates the data structure of the item database 24. The items mean countermeasures taken to improve the production efficiency. The countermeasures include countermeasures that do not require direct modification of the production equipment itself, for example, changing the position of a quality check table to the closer position and placing a step ladder to provide a pathway beside a machine, and countermeasures that modify the production equipment, for example, extending a hose of an air gun and attaching a cover for protection from the scattering of machining dust. The countermeasures may also include changing the work process and changing the materials or the tools to be used.

The item database 24 is a database configured to store the past records of application of these items. "Item ID" denotes unique identification information allocated to a past record of application of each item. "Object Process" denotes a process into which the item is classified, based on its purpose and the like. For example, the object process shows which operation process, such as "quality checking" or "replacement of the cutting edge", the item is applied to, for the purpose of improvement. The object process may be set freely and may be set, for example, based on the type of the production equipment which the item is applied to. "Contents" denote the description of the details of the item in natural language, for example, "changing the position of the quality check table to the closer position". "Improvement Point" denotes the description of the effect of improvement by each item in natural language, for example, "stable work by reduction of fatigue". These are basic information of the item corresponding to the "Item ID".

The item database 24 stores a plurality of past records of application of each item as "Application Record". "Application Record" includes storage of "Basic Information ID" and "Production Management Index Change". The basic information ID links each application record with the basic information in the detection result storage unit 23 and thereby enables, for example, the date and the production line to which each item is applied, to be specified. "Production Management Index Change" stores the effect by application of the item or more specifically, changes in the production management indexes, such as operational availability and the cycle time before and after application of the item. The production management index change is obtained by comparison between the results of detection before and after application of the item as described above. "Basic Information ID" accordingly stores two or more basic information IDs used for such comparison.

B. Output Example of Chart

Figure 3:
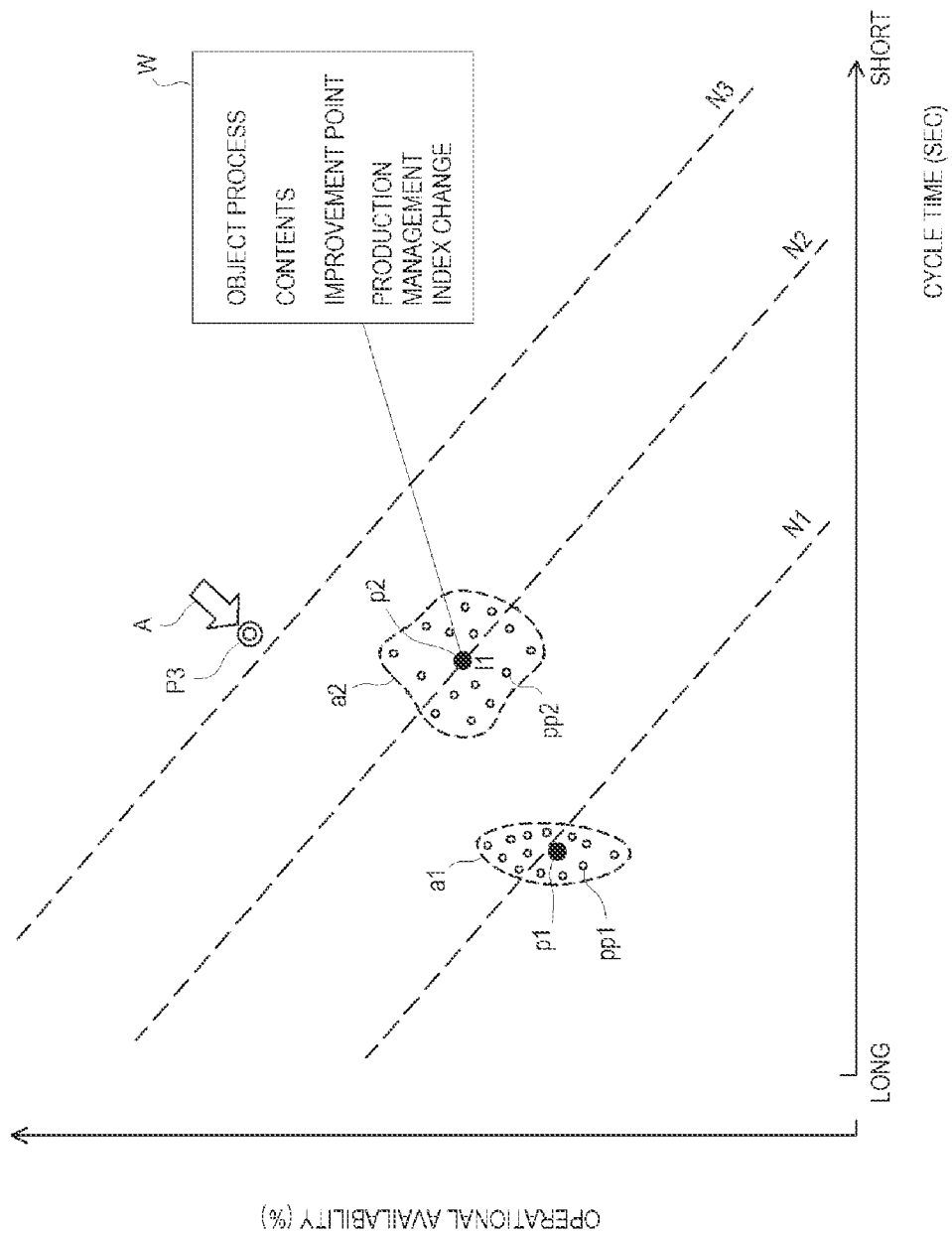
FIG. 3 is an explanatory diagram illustrating an output example of a chart.

FIG. 3 is an explanatory diagram illustrating an output example of a chart. This shows an example of a screen displayed by the production efficiency improvement support system 20, based on the results of detection from the production equipment 10.

This chart has the cycle time as abscissa and the operational availability as ordinate. The shorter cycle time means the more improvement of the production efficiency. Accordingly, the axis of the cycle time is set to be shorter rightward. The axis of the cycle time may, however, be set to be longer rightward with a left-side point as the origin.

Diagonal broken lines N1, N2 and N3 in the chart are lines to keep the production output per unit time (number/hour) fixed. The production outputs corresponding to the broken lines N1, N2 and N3 may be set arbitrarily.

Points pp1 and points pp2 of open circles indicate the results of detection. The cycle time and the operational availability change during one-day operation of the production equipment. There is accordingly a variation of the displayed points as illustrated. It is very important to recognize such a variation of the results of detection in the chart, in order to improve the production efficiency. For example, the results of detection having a variation rather in the direction of ordinate, like the points pp1 encircled by a curve a1, mean an unstable variation of the operational availability. It is thus presumed that the production equipment is frequently stopped during the one-day operation. This suggests that one problem is to stabilize the operational availability, in order to improve the production efficiency. The results of detection having a variation in the direction of abscissa, on the other hand, mean a variation of the cycle time. This suggests that reevaluation of the process is effective. According to the embodiment, displaying a variation in the results of detection in a visually recognizable manner effectively supports the improvement of the production efficiency.

In the chart, the points pp1 and the points pp2 show the results of detection in one identical production line with application of different items. Accordingly, the points pp1 and the points pp2 visually show the improvement effects by application of the respective items. For the purpose of discrimination, the results of detection with application of different items are displayed in different display modes according to the embodiment. The display mode employed for the discrimination is changing the color according to the embodiment but may be changing the shape or the size of symbols. This configuration enables the results of detection with application of different items to be visually discriminated from each other in the display of the chart and allows for easy recognition of the effects of application of the respective items.

An additional display may also be employed for easy recognition of a variation in the results of detection with application of a common item. In the illustrated example, a curve a1 and a curve a2 respectively including the points pp1 and the points pp2 are displayed. This configuration clearly shows the respective outer edges of the results of detection and allows for visual recognition of the variations by the areas and the shapes of the regions encircled by the curve a1 and the curve a2. In the configuration of displaying the curve a1 and the curve a2, the insides of the respective curves a1 and a2 may be shown by gradation according to the densities of the points, instead of showing the respective points pp1 and pp2.

Points p1 and p2 of closed circles indicate values of the actual cycle time and the actual operational availability. The actual cycle time and the actual operational availability are representative values obtained by statistical processing of the points pp1 and the points pp2 as the results of detection. The display of the actual cycle time and the actual operational availability has such advantages as relatively objective recognition of a variation in the results of detection relative to the point of the actual cycle time and the actual operational availability as a reference point.

The chart may also be configured to give an additional display that indicates the applied item with regard to the results of detection. For example, a letter string "I1" displayed in the vicinity of the point p2 is an item ID of the applied item. This configuration allows for easy recognition of the item applied. In the case of application of a plurality of items, a plurality of item IDs may be displayed. Among the items applied to the points pp1 and the points pp2, only different items may be displayed. The location of display is not necessarily in the vicinity of the point p1 or the point p2 but may be selected arbitrarily, for example, in the vicinity of the curve a1 or the curve a2.

A configuration employable to display the details of the applied item may open a pop-up window W in response to, for example, specification of the point p2 with a pointing device and display the details of the item in the pop-up window W.

The chart may further be configured to additionally show target values of the operational availability and the cycle time. In the illustrated example of the embodiment, a point p3 is designated as target values by using a pointing device A, such as a mouse or a touch panel. The target values may be designated by another method, for example, a method of dragging the point p2. The designation of the target values in the chart has such advantages as visual recognition of the direction for improvement of the operational availability and the cycle time, and easy selection of countermeasures for this purpose.

In the case of designating the target values in the chart, one employable configuration may calculate realistically improvable ranges of the operational availability and the cycle time by referring to the improvement effects of the respective items on the previous operational availability and the previous cycle time and accept the designation of the target values only in the calculated ranges. For example, it is assumed that improvement of each of the operational availability and the cycle time by 10 percent is the realistic limitation. When a target value designated exceeds this realistic limitation, an employable configuration may display a message, such as "Please reset the target value", without displaying a symbol like the point p3. Another employable configuration may display an area where the target values are allowed to be set and accept the designation of the target values only in this area.

It is not necessary to make the entirety of the displays in the display example of the chart described above, but some of the displays may be employed selectively. Adoption or non-adoption of each display may be switched over, in response to the operator's instruction.

C. Example of Processing

The following describes the details of the processing, for example, display of the chart shown in FIG. 3, in the production efficiency improvement support system 20. The following description illustrates the configuration of performing a process afterwards by using, for example, the results of detection stored in the detection result storage unit 23. Another procedure may, however, perform each process in real time with receiving information from the production equipment 10.

Figure 4:
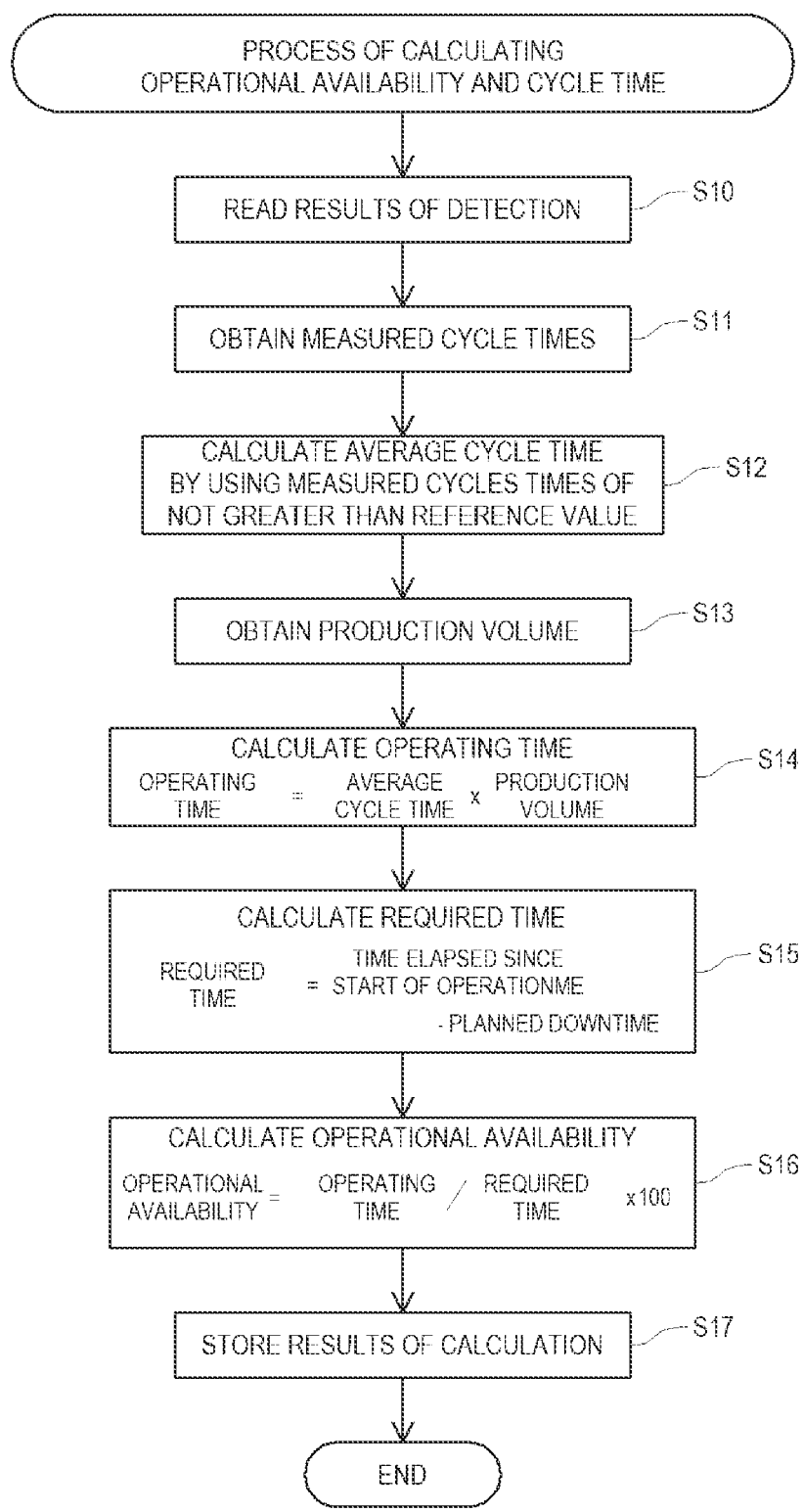
FIG. 4 is a flowchart showing a process of calculating an operational availability and a cycle time.

FIG. 4 is a flowchart showing a process of calculating the operational availability and the cycle time. This process is mainly performed by the production management index calculator 25 shown in FIG. 1 and is performed by the CPU of the production efficiency improvement support system 20 as the hardware configuration.

When the process starts, the production efficiency improvement support system 20 reads the results of detection from the detection result storage unit 23 (step S10).

The production efficiency improvement support system 20 extracts a production completion pulse of a product from the results of detection and obtains a measured cycle time, based on the time interval of extraction of this pulse (step S11). The pulse may be extracted, for example, by using "Sensor ID" for detection of the production completion pulse. The production completion pulse is output every time the product is produced. The measured cycle time is thus obtained correspondingly every time the production completion pulse is output.

The production efficiency improvement support system 20 subsequently uses the measured cycle times of not greater than a reference value, among the obtained measured cycle times, to calculate an average cycle time (step S12). The reference value may be set in any of various ways. According to the embodiment, twice an expected cycle time set based on a mean value, a mode value or the like of the past data of the cycle time is used as the reference value. Using the measured cycle times of not greater than the reference value enables the average value to be calculated by excluding abnormally long apparent measured cycle times due to a stop of the production equipment or the like. A calculated value of the average cycle time is obtained correspondingly every time the measured cycle time is obtained.

The production efficiency improvement support system 20 subsequently obtains a production volume (step S13). The production volume is the number of products accumulated until the time when the average cycle time is calculated as described above. The production volume to be accumulated is the number of products corresponding to the measured cycle times of not greater than the reference value.

The production efficiency improvement support system 20 calculates an operating time at a time point corresponding to each of the measured cycle times, based on the values obtained as described above (step S14). The operating time is determined by average cycle time×production volume. The operating time means a time period when the production equipment actually works to produce the products. The operating time may otherwise be determined by integrating the measured cycle times of not greater than the reference value.

The production efficiency improvement support system 20 also calculates a required time (step S15). The required time means a time period when the production equipment is originally required to operate continuously. According to the embodiment, the required time is calculated by "time elapsed since start of operation−planned downtime". An example of the planned downtime is a lunch break.

The production efficiency improvement support system 20 then calculates the operational availability, based on the values obtained as described above (step S16). The operational availability is calculated by operating time/required time×100.

The method of calculating the operational availability and the cycle time is not limited to the above method. For example, another available method may divide a running time of the production equipment into a plurality of time zones of some durations, determine a downtime when the production equipment is at stop due to some reason in each time zone, and calculate the operational availability by (duration of time zone−downtime)/(duration of time zone)×100%.

The method may also determine the production volume of the product in this time zone and calculate the cycle time by (duration of time zone−downtime)/production volume.

Any of various other methods may be employed to calculate the operational availability and the cycle time.

After calculating the operational availability and the cycle time by the above series of processing, the production efficiency improvement support system 20 stores the results of calculation (step S17) and terminates the process of calculating the operational availability and the cycle time. The calculated operational availability and the calculated cycle time are used for display of the points pp1 and the pints pp2 in the chart (shown in FIG. 3).

Figure 5:
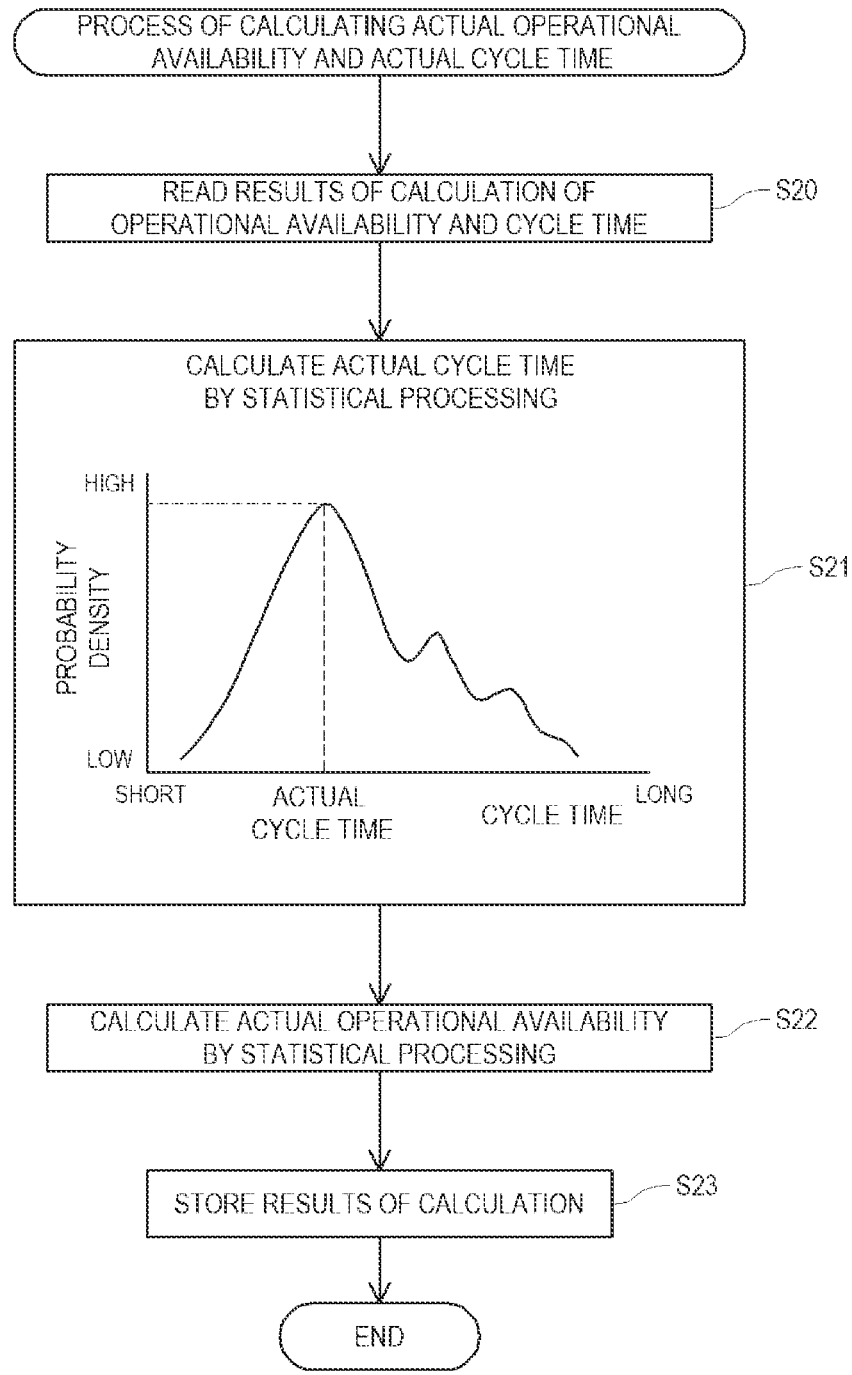
FIG. 5 is a flowchart showing a process of calculating an actual operational availability and an actual cycle time.

FIG. 5 is a flowchart showing a process of calculating the actual operational availability and the actual cycle time. This process is mainly performed by the production management index calculator 25 shown in FIG. 1 and is performed by the CPU of the production efficiency improvement support system 20 as the hardware configuration.

When the process starts, the production efficiency improvement support system 20 reads the results of calculation of the operational availability and the cycle time (step S20) and calculates the actual cycle time by statistical processing (step S21). A method of calculating the actual cycle time is shown in the flowchart.

The cycle time is varied by a variety of factors during production. A graph illustrated in the flowchart shows a probability density function when the varying cycle time is regarded as a continuous function. As illustrated, the probability density function has a maximum value at a certain cycle time. According to this embodiment, the cycle time corresponding to this maximum value is adopted as the actual cycle time. When the cycle time is regarded as discrete values, the cycle time corresponding to a maximum frequency may be adopted as the actual cycle time. When the cycle time is regarded as discrete values, however, it is preferable to limit the number of significant digits of the cycle time and perform quantization. The actual cycle time is not limited to those calculated by these methods but may be, for example, an average value or a median value.

The production efficiency improvement support system 20 subsequently calculates the actual operational availability by statistical processing (step S22). The actual operational availability is calculable by statistical processing similar to the statistical processing performed to calculate the actual cycle time. When the maximum value described above is adopted for the actual cycle time, the actual operational availability is not necessarily a maximum value but may be an average value or a median value.

After calculating the actual operational availability and the actual cycle time by the above series of processing, the production efficiency improvement support system 20 stores the results of calculation (step S23) and terminates the process of calculating the actual operational availability and the actual cycle time. The calculated actual operational availability and the calculated actual cycle time are used for display of the point p1 and the point p2 in the chart (shown in FIG. 3).

Figure 6:
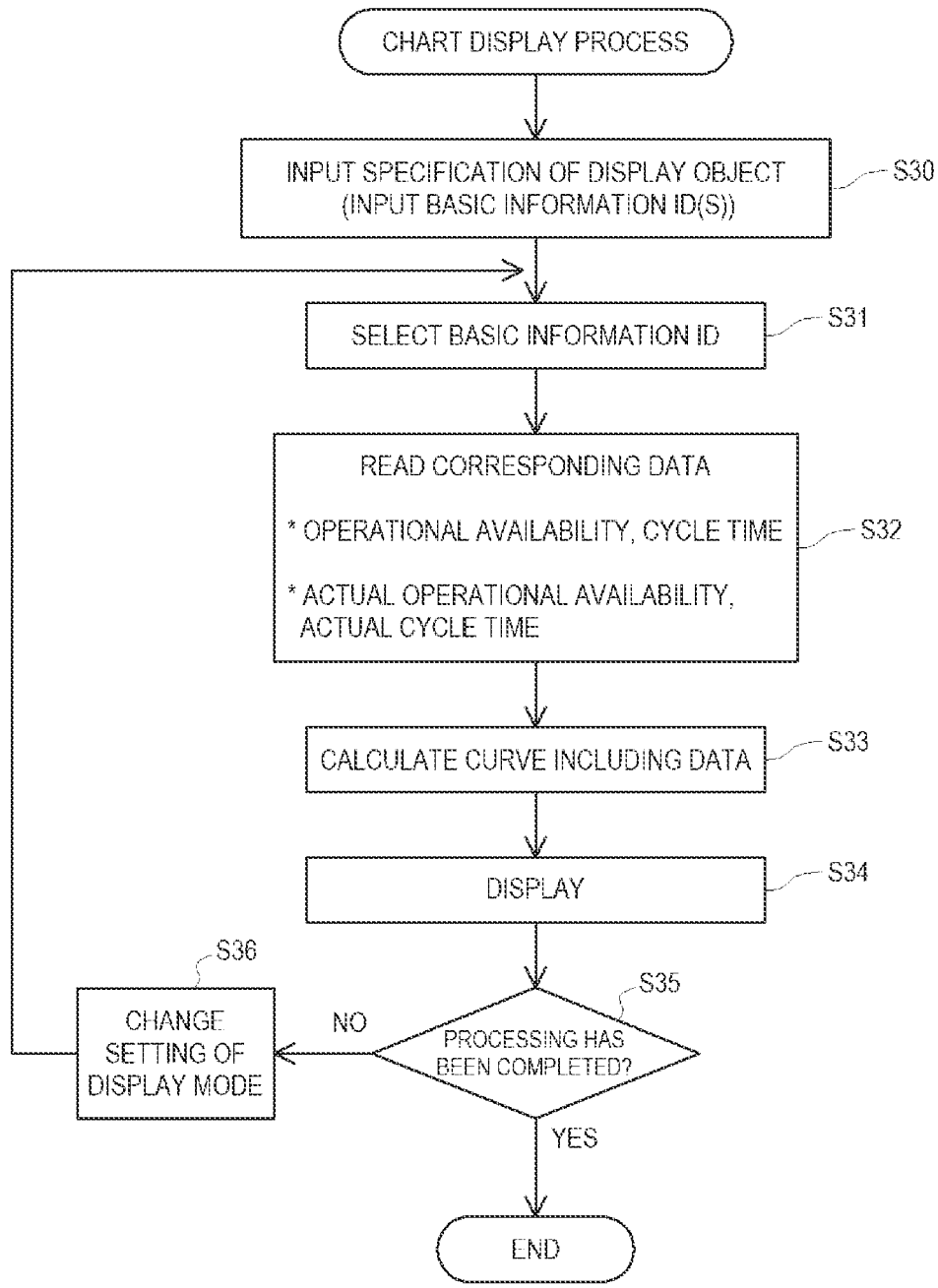
FIG. 6 is a flowchart showing a chart display process.

FIG. 6 is a flowchart showing a chart display process. This process is mainly performed by the display controller 27 shown in FIG. 1 and is performed by the CPU of the production efficiency improvement support system 20 as the hardware configuration.

When the process starts, the production efficiency improvement support system 20 inputs specification of a display object (step S30). According to the embodiment, the display information ID (shown in FIG. 2) is input. According to a modification, the production efficiency improvement support system 20 may specify the display information ID corresponding to input of information such as the date and the production line. The chart may be displayed corresponding to a plurality of basic information IDs as shown in FIG. 3, so that a plurality of the basic information IDs may be input here.

The production efficiency improvement support system 20 subsequently selects the basic information ID to be displayed (step S31). When only one basic information ID is input at step S30, the input basic information ID is selected. When a plurality of basic information IDs are input at step S30, one of the input basic information IDs is selected.

The production efficiency improvement support system 20 subsequently reads data corresponding to this basic information ID (step S31). More specifically, the production efficiency improvement support system 20 reads the results of calculation of the operational availability and the cycle time and the results of calculation of the actual operational availability and the actual cycle time. Reading of the actual operational availability and the actual real time may be omitted.

The production efficiency improvement support system 20 then calculates a curve including the read operational availability and the read cycle time (step S33). The curves a1 and a2 in the chart (shown in FIG. 3) correspond to this curve. A known image processing technique may be employed to calculate this curve, and its description is omitted. In the configuration of not displaying the curves a1 and a2, the processing of step S33 may be omitted.

After completion of the calculation required for display, the production efficiency improvement support system 20 displays the chart shown in FIG. 3 (step S34). When the above series of processing has been completed with regard to all the basic information IDs (step S35), the production efficiency improvement support system 20 terminates the chart display process.

When the above series of processing has not yet been completed with regard to all the basic information IDs (step S35), the production efficiency improvement support system 20 changes the setting of the display mode (step S36) and repeats the processing of and after step S31 to display the chart corresponding to the remaining basic information ID.

Figure 7:
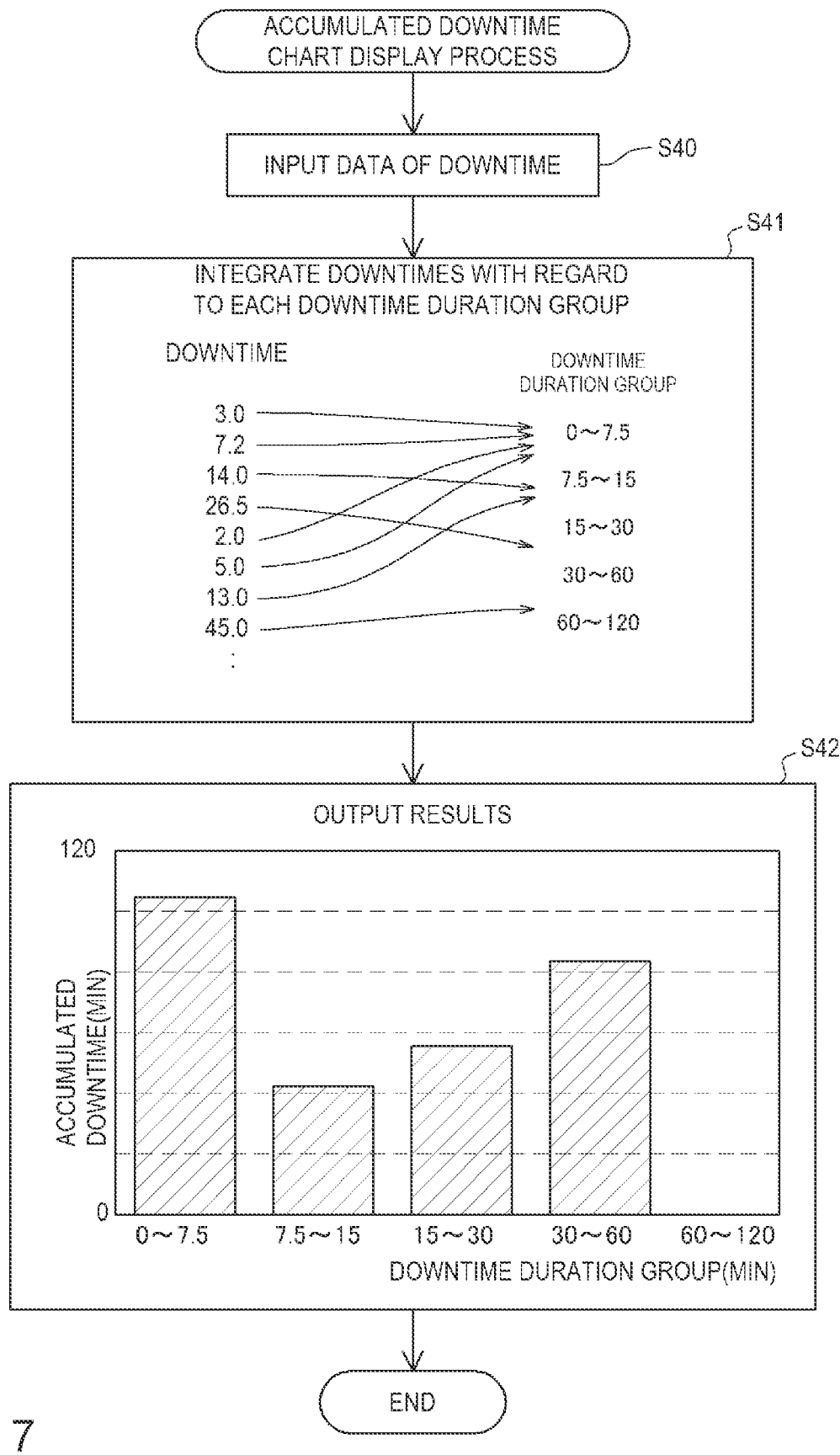
FIG. 7 is a flowchart showing an accumulated downtime chart display process.

FIG. 7 is a flowchart showing an accumulated downtime chart display process. This process is mainly performed by the production management index calculator 25 and the display controller 27 shown in FIG. 1 and is performed by the CPU of the production efficiency improvement support system 20 as the hardware configuration.

When the process starts, the production efficiency improvement system 20 inputs data of the downtime (step S40) and integrates the downtimes with regard to each downtime duration group (step S41).

A method of integration is illustrated in the flowchart. In this example, the downtime duration groups are set as 0 to 7.5 minutes, 7.5 to 15 minutes, 15 to 30 minutes, 30 to 60 minutes, and 60 to 120 minutes.

The input data of downtime are shown on the left side. The production equipment may stop due to various factors during production. The data of downtime shown on the left side are time series input data of durations during which the production equipment is at stop. The processing of step S41 allocates each of the downtimes shown on the left side to one of the downtime duration groups shown on the right side as shown by each arrow. For example, the first downtime is 3 minutes and is thus allocated to the downtime duration group of 0 to 7.5 minutes. The third downtime is 14 minutes and is thus allocated to the downtime duration group of 7.5 to 15 minutes. The downtimes allocated to the respective downtime duration groups are then integrated individually with regard to each downtime duration group. The production efficiency improvement support system 20 accordingly obtains the accumulated downtime with regard to each downtime duration group.

The production efficiency improvement system 20 then outputs the obtained results (step S42). An output chart is shown in the flowchart. According to the embodiment, a format of histogram is adopted to show the accumulated downtimes with regard to the respective downtime duration groups. It is understood from this chart that the downtime duration group of 0 to 7.5 minutes has the highest accumulated downtime. Although each downtime is short in the downtime duration group of 0 to 7.5 minutes, the frequent stops result in increasing the accumulated downtime. This suggests that eliminating the causes of the stops corresponding to this downtime duration group efficiently reduces the accumulated downtime and contributes to improvement of the production efficiency.

In a configuration of outputting only the downtime of the production equipment, an event having a long downtime, for example, an event corresponding to the downtime duration group of 30 to 60 minutes, is likely to draw attention. The configuration of this embodiment, however, displays the accumulated downtime and thereby draws attention to the cause of the stop that is to be eliminated.

Any of various formats may be used for the chart as long as the format allows for comparison among the accumulated downtimes of the respective downtime duration groups.

The downtime duration groups are not limited to the illustrated example but may be set arbitrarily. The duration of the downtime duration group may be fixed or may differ among the respective downtime duration groups. It is not necessary that the downtime duration group is unequivocally mapped to the cause of the stop of the production equipment. A configuration of setting the downtime duration group to be mapped to the expected cause of the stop as unequivocally as possible by taking into account the relationship between the expected cause of the stop and the resulting downtime has such an advantage as to relatively readily find a countermeasure for eliminating the cause of the stop.

Figure 8:
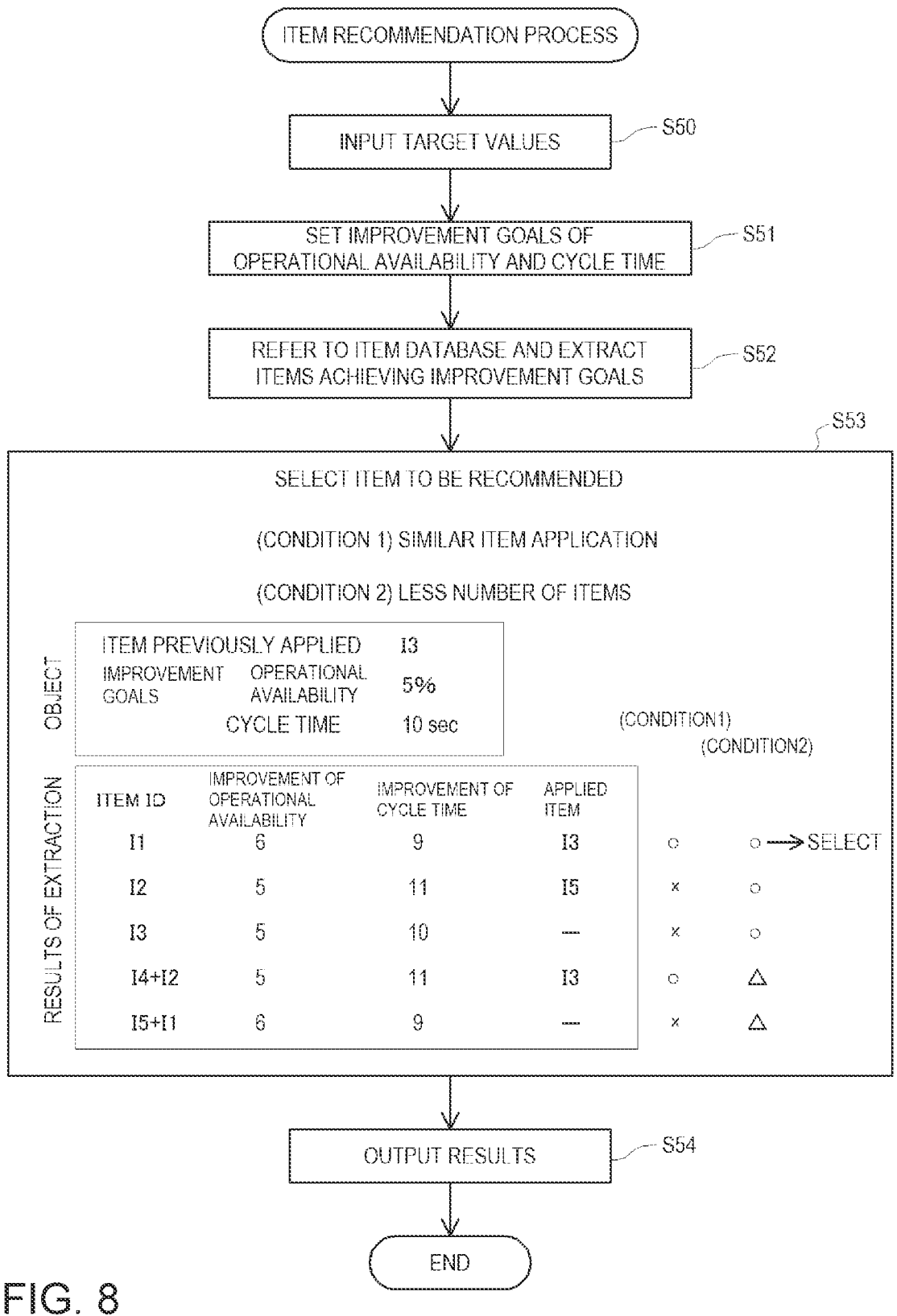
FIG. 8 is a flowchart showing an item recommendation process.

FIG. 8 is a flowchart showing an item recommendation process. This process is mainly performed by the item recommender 28 shown in FIG. 1 and is performed by the CPU of the production efficiency improvement support system 20 as the hardware configuration. Prior to this process, the effects of application of the respective items are analyzed in advance and are stored in the item database 24. The method of analysis is in conformity with the description of the item effect analyzer 26 shown in FIG. 1.

When the item recommendation process starts, the production efficiency improvement support system 20 inputs target values (step S50). The chart shown in FIG. 3 may be configured to allow for the input, or the target values of the operational availability and the cycle time may be input by using a keyboard or the like. Inputting the target values is not necessarily inputting "targeted values" of the operational availability and the cycle time but may be inputting "target ranges". The target values may be specified by specifying the production output per unit time (the diagonal lines N1 to N3 on the chart of FIG. 3).

The production efficiency improvement support system 20 sets improvement goals of the operational availability and the cycle time, based on the input target values (step S51). Differences between the target values and the previously achieved values may be set as the improvement goals.

The production efficiency improvement support system 20 subsequently refers to the item database 24 and extracts items that achieve the improvement goals (step S52). The item database 24 stores the past records of the effects of application of the respective items on improvement of the operational availability and the cycle time. Accordingly, items having the effects exceeding the improvement goals are extracted from the item database 24. The items to be extracted may be limited to those of the common production line or the common product.

The production efficiency improvement support system 20 selects an item to be recommended among the extracted items (step S53). A method of selection is shown in the flowchart. According to the embodiment, the item to be recommended is selected based on (condition 1) similar item application and (condition 2) less number of items newly applied.

An upper frame illustrated in the flowchart shows the outline of the specified target values. It is here assumed that improvement of the operational availability by 5% and improvement of the cycle time by 10 sec are specified as improvement goals with regard to a production line which an item I3 has already been applied to.

A lower frame shows the results of extraction of items at step S52 with their effects. For example, a first line from the top shows the record of the effects of application of an item I1: improvement of the operational availability by 6% and improvement of the cycle time by 9 sec. "Applied Item" of I3 means that this record is the results obtained by newly applying the item I1 under prior application of the item I3. The same applies to the results of extraction on second and subsequent lines. In a fourth line and a fifth line, the item IDs "I4+I2" and "I5+I1" mean that these records are the effects obtained by simultaneously applying the respective two items.

The relationship of the respective results of extraction to the condition 1 and the condition 2 are shown on the right side of the lower frame. The record on the first line is the results under prior application of the item I3, which is identical with the specification in the object, so that the (condition 1) is satisfied (open circle). The number of the newly applied items is only one, i.e., the item I1, so that the (condition 2) is also satisfied (open circle).

The record on the second line is the results under prior application of an item I3, so that the (condition 1) is not satisfied (cross mark). The number of the newly applied items is only one, i.e., the item I2, so that the (condition 2) is satisfied (open circle). The record on the third line has similar results of evaluation.

The record on the fourth line is the results under prior application of the item I3, so that the (condition 1) is satisfied (open circle). The number of the newly applied items is two, i.e., the items I4 and I2, so that the (condition 2) is not completely satisfied (open triangle).

The record on the fifth line is the results with prior application of no item, so that the (condition 1) is not satisfied (cross mark). The number of the newly applied items is two, i.e., the items I5 and I1, so that the (condition 2) is not completely satisfied (open triangle). Based on the above evaluation, the item I1 on the first line having the best results of comprehensive evaluation of the condition 1 and the condition 2 is selected.

The production efficiency improvement support system 20 outputs the results (step S54) and then terminates the item recommendation process. According to the embodiment, the contents and the like of the selected item I1 are displayed. The displayed location may be on the chart (shown in FIG. 3) or may be screen switching.

The item recommendation process is not limited to the method described in FIG. 8 but may be performed by using an artificial intelligence. Generating a learning model by machine learning using the past records of application of the respective items as learning data enables an item for achieving target values to be obtained.

D. Advantageous Effects and Modifications

The production efficiency improvement system of the embodiment described above outputs the detected operational availability and the detected cycle time in the form of a chart to make the variations of the operational availability and the cycle time recognizable. As a result, the production efficiency improvement support system facilitates recognition of how to improve the operational availability and the cycle time and which item is effective for this purpose, and thereby effectively supports improvement of the production efficiency.

It is not necessary that the aspects of the present disclosure are provided with all the various features described in the embodiment, but part of such features may appropriately be omitted or be provided in combination with other features. The present disclosure is not limited to the embodiment described above but may be implemented by a variety of other aspects.

The present disclosure is applicable to support improvement of the production efficiency in production equipment used to produce a product.

What is claimed is:

1. A production efficiency improvement support system for supporting improvement in production efficiency of production equipment used to produce a product, the production efficiency improvement support system comprising:
a storage unit storing detection results obtained by detecting an operation status of the production equipment during operation of the production equipment;
a production management index calculator configured to calculate an operational availability that is a ratio of time during which the production equipment is operating, and a cycle time that is a time period required to produce the product, a plurality of times during the operation of the production equipment, based on the detection results read from the storage unit; and
a display controller configured to display a chart with the operational availability as an ordinate and the cycle time as an abscissa, by plotting a plurality of points corresponding to the calculated operational availability and the calculated cycle time such that dispersion of the plotted points visually represents variations in the calculated operational availability and the calculated cycle time, wherein the dispersion of the plotted points in a direction along the ordinate indicates an unstable operation of the production equipment, while dispersion of the plotted points in a direction along the abscissa indicates an unstable production process, which are visually recognizable.

2. The production efficiency improvement support system according to claim 1,
wherein the production management index calculator is further configured to calculate an actual cycle time as a representative value of a plurality of the cycle times by a statistical processing, and
the display controller is further configured to additionally display the actual cycle time in the chart.

3. The production efficiency improvement support system according to claim 1,
wherein the production management index calculator is configured to calculate the operational availability and the cycle time with regard to an application state of each item for improving the production efficiency, and
the display controller is configured to display the operational availability and the cycle time by changing a display mode according to the application state of the item, thereby allowing comparison between different states of item application.

4. The production efficiency improvement support system according to claim 3,
wherein the display controller is configured to display the operational availability and the cycle time in relation to each application state of the item such that the item applied to is recognizable in the chart.

5. The production efficiency improvement support system according to claim 1,
wherein the display controller is configured to allow a target production efficiency to be input in the chart by operating a pointing device.

6. The production efficiency improvement support system according to claim 1, further comprising:
an input unit configured to input a target production efficiency; and
an item database that stores a record of effects of each item on the operational availability and the cycle time, the item being applied to for improving the production efficiency,
wherein the production efficiency improvement support system is configured to refer to the item database and provide a recommendation of an item to be applied to make the operational availability and the cycle time of the production equipment approach respective target values.

7. The production efficiency improvement support system according to claim 1, wherein:
the storage unit further stores downtimes of the production equipment;
the production management index calculator is further configured to refer to the downtimes stored in the storage unit, and to calculate an accumulated downtime for each of a plurality of downtime duration groups, by allocating and accumulating the downtimes for each of the downtime duration groups according to respective durations of the downtimes, each downtime duration group corresponding to a specific range of downtime duration associated with to a possible cause of the downtime of the production equipment; and
the display controller is further configured to display a chart showing the accumulated downtime for each of the downtime duration groups, thereby visually drawing attention to a highest accumulated downtime and the corresponding downtime duration group.

8. A production efficiency improvement support method implemented in a computer, for supporting improvement in production efficiency of production equipment used to produce a product, the production efficiency improvement support method comprising:
storing, in a storage unit of the computer, detection results obtained by detecting an operating status of the production equipment during operation of the production equipment;
calculating, using the computer, an operational availability that is a ratio of time during which the production equipment is operating, and a cycle time that is a time period required to produce the product, a plurality of times during the operation of the production equipment, based on the detection results read from the storage unit; and
displaying, on a display screen, a chart with the operational availability as an ordinate and the cycle time as an abscissa, by plotting a plurality of points corresponding to the calculated operational availability and the calculated cycle time such that dispersion of the plotted points visually represents variations in the calculated operational availability and the calculated cycle time, wherein the dispersion of the plotted points in a direction along the ordinate indicates an unstable operation of the production equipment, while dispersion of the plotted points in a direction along the abscissa indicates an unstable production process, which are visually recognizable.

9. A non-transitory computer-readable storage medium with executable program stored thereon, wherein the program instructs a microprocessor to perform the production efficiency support method according to claim 8.

10. The production efficiency improvement support method according to claim 8, further comprising:

setting a plurality of downtime duration groups in the computer, each downtime duration group corresponding to a specific range of downtime duration associated with a possible cause of a downtime of the production equipment;

storing, in the storage unit, the detection results including downtimes of the production equipment;

calculating, using the computer, an accumulated downtime for each of the plurality of downtime duration groups, by allocating and accumulating the downtimes read from the storage unit for each downtime duration group according to respective durations of the downtimes; and displaying, on the display screen, a chart showing the accumulated downtime for each of the downtime duration groups, thereby visually drawing attention to a highest accumulated downtime and the corresponding downtime duration group.

11. A non-transitory computer-readable storage medium with an executable program stored thereon, wherein the program instructs a microprocessor to perform the production efficiency support method according to claim 10.

* * * * *